Aug. 17, 1965  SADAHARU WADA  3,201,674
EDDY CURRENT BRAKE TO CONTROL MOTOR SPEED
Filed March 5, 1962  7 Sheets-Sheet 1

Inventor
Sadaharu Wada
By Stevens Davis Miller & Mosher
Attorneys

United States Patent Office 3,201,674
Patented Aug. 17, 1965

3,201,674
EDDY CURRENT BRAKE TO CONTROL MOTOR SPEED
Sadaharu Wada, Hirakata-shi, Osaka, Japan, assignor to Matsushita Electric Industrial Co., Ltd., Osaka, Japan, a corporation of Japan
Filed Mar. 5, 1962, Ser. No. 177,275
Claims priority, application Japan, Mar. 8, 1961, 36/8,339; Oct. 21, 1961, 36/53,099, 36/53,101; Nov. 9, 1961, 36/40,583; Dec. 20, 1961, 36/63,310, 36/63,311
6 Claims. (Cl. 318—302)

This invention relates to automatic control for visual image recording and reproducing systems, and more particularly to automatic control apparatus for television-image recording and reproducing by use of magnetic tapes.

In general, television images are recorded on photographic films by use of motion picture cameras focussed onto the television images being produced on television receivers, or are recorded by applying on magnetic tapes television signals being transmitted to television receivers for producing magnetic records on the tape. In the latter case, the magnetic tape having television signals recorded thereon can be used for broadcasting the corresponding television program, as is well-known. The present invention to to provide improved automatic control apparatus adapted for use in such systems for recording television-image signals on magnetic tapes and for reproducing the same.

In recording directly on magnetic tapes television signals or similar signals of extremely high frequencies or of extremely broad frequency bands, extremely high relative speeds are required between the gaps of either recording or reproducing magnetic heads and the magnetic tapes in order to enable the high frequency components of the recorded signals to be reproduced. For this purpose, for recording even a fifteen-minute program of television on a magnetic tape, extremely bulky and inconvenient-to-handle tape reels were necessary to use, besides other various disadvantages due to the extremely high tape speed.

Various methods for lowering the requisite tape speed have heretofore been proposed, among which the most successful one is to employ a plurality of recording heads. Such magnetic heads are mechanically moved at a high speed in the direction transverse to the magnetic tape. By combination of the transversal movement of the recording heads and the longitudinal run of the tape, the required high relative speed is obtained between the head gaps and the tape, with a remarkably lowered tape speed in the longitudinal direction. The tape may be driven in the longitudinal direction at a relatively low speed of say, 15 inches per second, and the transversally moving heads produce records of signals on the tape as a series of transversal tracks. Such a system enables fairly acceptable recording of television signals, it is considered necessary to assemble four recording heads precisely on a disc rotating at 14,400 r.p.m., for satisfactory operation of the system. In addition, in order to synchronize signals during both the recording and the reproducing, a system must be provided for synchronizing the mechanical elements, such as driving motors.

Various types of automatic controls for accomplishing the above-mentioned synchronization have heretofore been employed, and the major portions of them are occupied by rotating mechanisms including electric motors. Among them, a frequency control system has broadly been employed for controlling the number of revolutions per unit time of the electric motor to accomplish the necessary synchronization. In such a system, the control reference of automatic control is the frequency of the electric supply source kept synchronous with the requisite rotating speed of the electric motor. By using a synchronous motor, the motor speeds and the source frequencies are made directly proportional to each other. However, for taking advantage of such a system in full, the synchronous motor should be driven or energized solely from an appropriate oscillator through a driving amplifier; any commercial frequency supply source cannot be utilized for energizing the synchronous motor.

Accordingly, the primary object of the present invention is to provide an improved automatic control apparatus for broad-band image recording and reproducing system in which corresponding electric signals are recorded on a magnetic tape.

Another object of the invention is to provide a control apparatus of the kind specified comprising a driving electric motor energized for a commercial supply source, and means for utilizing braking torques directly proportional to the rotating speeds of the driving motor as the control reference, such braking torques being applied to the electric motor under control of an electro-mechanical brake element.

Another object of the invention is to provide a control apparatus of the kind specified comprising means for effecting constant speed rotation of the electric motor energized from a commercial supply source by assigning a predetermined value of braking force to the brake element during the recording operation, and means for establishing an automatic control loop during the reproducing operation, the control loop including the electric motor and the brake element, and being effective to regulate the braking force around the predetermined value.

Another object of the invention is to provide a control apparatus of the kind specified comprising means for effecting constant speed rotation of the electric motor energized from a commercial supply source by assigning a predetermined value of braking force to the brake element during the recording operation, the predetermined value being so selected in the range from zero to the maximum braking force of the brake element that it is suitable for operation of the automatic control loop, and means for causing the selected value of braking force variable within a certain range which lies in the linear portion of a characteristic curve of the output torque versus the rotating speed of the electric motor of induction type.

A further object of the invention is to provide a control apparatus of the kind specified comprising means for supplying the electric motor with driving energy solely from a commercial A.C. supply source, and for effecting the braking by consuming part of the driving energy, means for connecting the load to one and the brake element to the other end of the electric motor shaft, and means for causing the electric motor to drive the magnetic tape, and for causing the heretobefore-mentioned automatic control loop to control the tape tracking automatically.

A still further object of the invention is to provide a control apparatus of the kind specified in which the electromechanical brake element utilizes eddy-current type, magnetic-fluid type, or magnetic-powder type controller, and supplied with the magnetising current from vacuum-tube type or transistor type of driving amplifier, or, during the recording operation only, from a constant current electrical source device.

A still further object of the invention is to provide a control apparatus of the kind specified comprising a controller of eddy-current type or others, having various abilities required for the brake element.

A further object of the invention is to provide an improved television-image recording and reproducing system comprising an automatic speed control for the magnetic-tape driving motor energized solely from a commercial A.C. supply source and applied with braking force under control of relatively small capacity devices.

There are other objects and particularities of the present invention, which will be made obvious from the following detailed description of some embodiments of the invention with reference to the accompanying drawings, in which.

Figure 1:
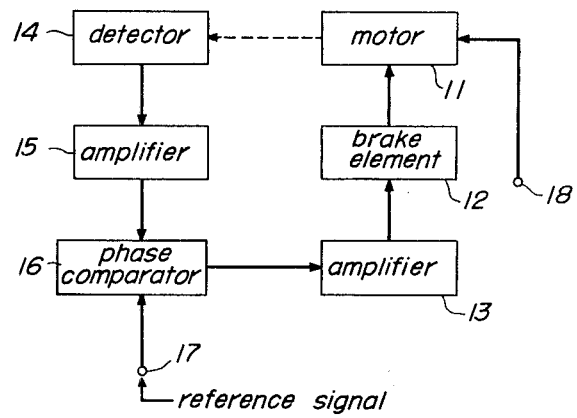
FIG. 1 is a block diagram showing an embodiment of the present invention.

Referring to the drawings, FIG. 1 shows by a block diagram an automatic control apparatus embodying the invention for use in image recording and reproducing system, which has been made relatively small in size and light in weight by utilization of electro-mechanical brake element.

Figure 15:
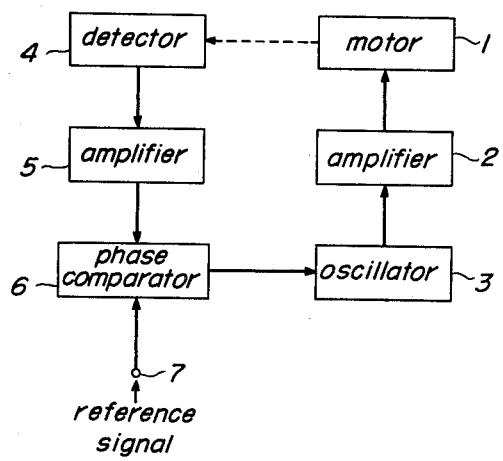
FIG. 15 is a block diagram of an automatic control apparatus for conventional television image recording and reproducing system.

Among the hereinbefore discussed known systems, a typical one is the so-called "Ampex System" developed by the Ampex Corporation, Redwood, Calif., U.S.A., and disclosed in detail in the American magazine Electronics, February 1957, pp. 138–144. This Ampex system may be represented by the block diagram of FIG. 15 of the accompanying drawings. In FIG. 15, an electric motor is shown by a rectangle 1 and drives a magnetic tape or a magnetic-head drum containing magnetic transducers, not shown. In case the motor 1 drives a magnetic tape, the motor is rotated at such a speed that the tape is caused to run at a linear speed of 15 inches per second. When the motor drives the tape in this manner, the motor is usually called "capstan motor," and the automatic control including capstan motor is called "capstan servo system." On the other hand, when the motor 1 drives a magnetic-head drum, the later is caused to rotate at a speed of 14,400 r.p.m. In this, the motor is usually called "head-drum motor," and the automatic control including such a motor is called "drum servo system." The capstan or head-drum motor should preferably be a synchronous motor. The control reference is a source frequency kept in synchronism with the rotating speed of the motor, and the motor speed is regulated in accordance with changes in the source frequency. By reason of this, the motor should be energized entirely from a motor-driving oscillator 3, instead of a commercial supply source, through a suitable amplifier 2. The source frequency for the motor is thus governed by the oscillator 3, the output of which is supplied to the motor 1 through the amplifier 2. Electric signals are produced in accordance with the motion of the magnetic tape or the magnetic-head drum driven by the motor 1, with periodicity directly proportional to such a motion. The electric signal thus produced is detected by a detector 4, and called "control signal" when a magnetic tape is driven by the motor 1, and called "PEC signal" when a head drum is driven by the motor 1. The signal detected by the detector 4 is supplied to a phase comparator 6 through a suitable amplifier 5. The reference signal is also supplied to the comparator 6 through an input terminal 7. The reference signal can be derived from vertical synchronizing signals of the input video signals during the recording operation, and derived from the A.C. source frequency during the reproducing operation. The phase comparator 6 compares the two input signals with each other to produce a D.C. output proportional to the phase error existing between the two signals, that is, the signals from the amplifier 5 and the input terminal 7. The D.C. output from the comparator 6 is supplied to the oscillator 3, and, in effect, controls the rotating speed of the driving motor 1 by changes in the source frequency. Thus, the energizing electric power for the motor 1 is entirely supplied from the oscillator 3, necessitating correspondingly large capacities of the oscillator 3 as well as the amplifier 2. This necessitates relatively a large size of motor. The present invention eliminates various disadvantages of the known system due to its complexity in operation and bulkiness of the motor driving source. According to the invention, an automatic control apparatus for image recording and reproducing system is obtained, which is relatively small in size, light in weight, and easy in maintenance.

Referring to FIG. 1, a motor 11 drives a magnetic tape or a magetic-head drum containing magnetic transducers, not shown, at a speed directly proportional to its rotating speed. The motor 11 is supplied with its energizing power entirely from a commercial A.C. supply source through a terminal 18, and its rotating speed is regulated by changes in braking effect applied thereto. As is heretobefore mentioned, the control reference for the automatic control is a braking torque directly proportional to the rotating speed of the motor 11. For controlling the braking torque applied to the motor 11, an electro-mechanical brake element represented by a rectangle 12 is employed. The brake element 12 is mechanically coupled to the shaft of the motor 11, and its braking effect is transmitted to the motor direct. The brake element comprises magnetizing coil or coils which is energized from a D.C. amplifier 13.

In accordance with the motion of the magnetic tape driven by the motor 11, electrical signals are produced having periodicity directly proportional to that motion, and detected by a detector 14. The control signal thus detected is amplified by an amplifier 15 and introduced into a phase comparator 16. Reference signals are also introduced into the phase comparator 16 through a terminal 17. The reference signals may be derived from so-called "head-drum pulse" signals proportional to the rotating speed of the magnetic-head drum which is in cooperation with the magnetic tape driven by the motor 11. The phase comparator functions to compare the phases of the two signals with each other, one being the control signal supplied from the detector 14 and the other the reference signal supplied from the terminal 17, and to produce a D.C. output proportional to the phase error of the control signal. The D.C. output is amplified by the amplifier 13 and supplied to the magnetizing coil of the brake element 12 for controlling the rotating speed of the motor 11. Thus, the control signals detected by the detector 14 are all translated to mechanical braking forces in the automatic control loop for controlling the rotating speed of the driving motor 11.

Figure 2:
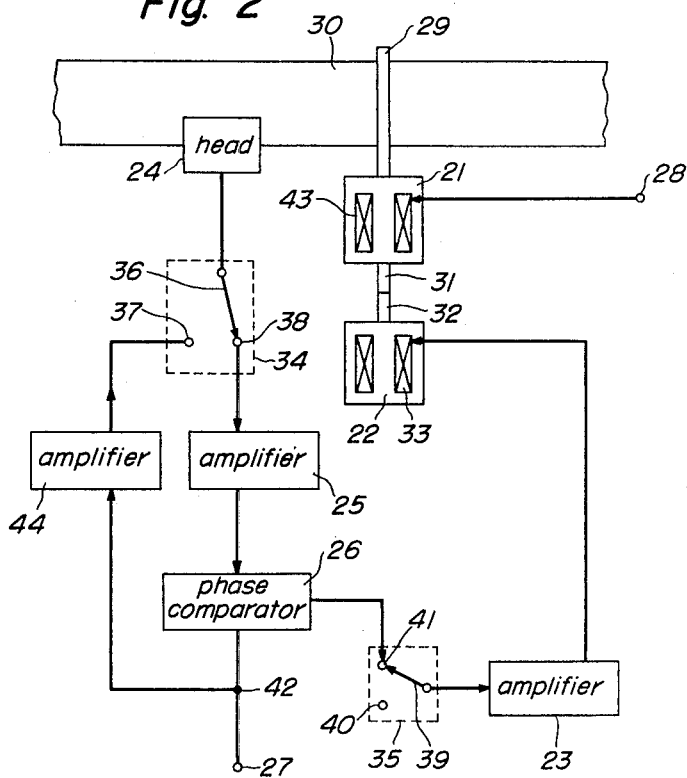
FIG. 2 is a diagram for illustration of the operation of the automatic control system shown in FIG. 1.

Referring to FIG. 2, a capstan servo system embodying the present invention is shown, in which the motor drives a magnetic tape and the tape tracking is automatically controlled. The motor 21 is energized by a commercial A.C. supply source applied to the coil 43 of the motor through the input terminal 28. The motor 21 has its rotating shaft extending outwardly in the opposite directions, the upper extension 29 serving as a capstan for driving a magnetic tape 30, while the lower extension 31 being mechanically coupled to the shaft 32 of an electro-mechanical brake element 22. The brake element 22 has magnetizing coils 33 which are energized from a D.C. amplifier 23. The motor 21 is shown as an induction motor which is preferable in the present invention.

There are provided two electrical switches 34 and 35 mechanically gauged with each other so that, during recording operation, the switch 34 has its movable contact 36 in engagement with its left-hand stationary contact 37 and the switch 35 has its movable contact 39 engaging its lower stationary contact 40, while, during reproducing operation, the switches 34 and 35 have their movable contacts 36 and 39 in engagement with the right-hand and the upper stationary contacts 38 and 41, respectively, as shown in FIG. 2.

Figure 3:
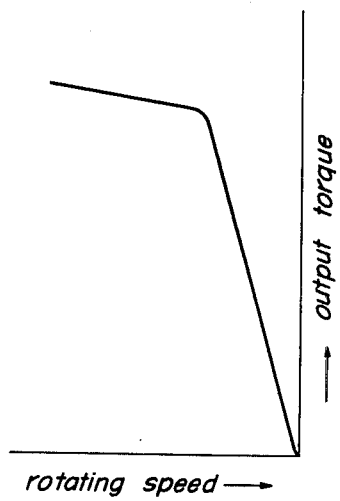
FIG. 3 shows a characteristic curve representing the relation between the rotating speed and the output of the electric motor adapted according to the present invention.

The motor 21 has a rotating speed vs. output torque characteristic curve as typically shown in FIG. 3. As here shown, the curve has a substantially linear portion within which the major portion of varying values of braking effect should be included during the reproducing operation.

Figure 4:
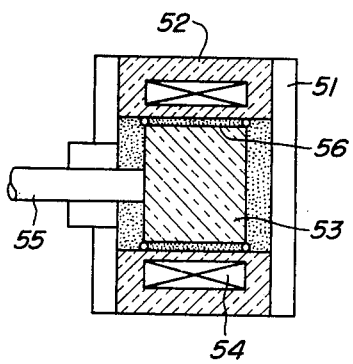
FIG. 4 shows somewhat diagrammatically the construction of a magnetic-fluid type controller adapted for use in the present invention.
Figure 5:
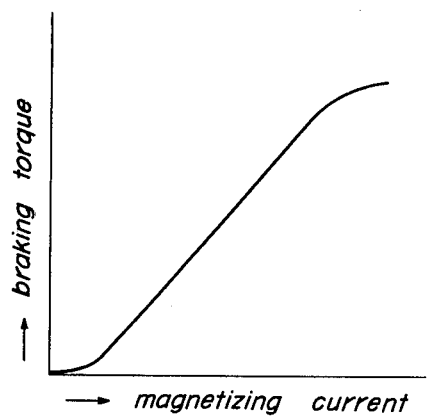
FIG. 5 shows a performance curve of the magnetic-fluid type controller.

FIG. 4 shows a magnetic-fluid type controller adapted for use in the apparatus shown in FIG. 2 as the brake element 22. The controller shown comprises external magnetic poles 52 carried fixed by a stationary supporting yoke 51. Each magnetic pole 52 is provided with a magnetizing coil 54 mounted therein. When D.C. current is passed through the magnetizing coils 54, magnetic flux is caused to flow through the looped paths formed by external magnetic poles 52, internal rotating magnetic pole 53, magnetic fluid filling the space 56 between the external magnetic poles 52 and the internal rotating magnetic pole 53. In proportion to the magnetizing current, the magnetic fluid increases its viscosity as the magnetic flux increases. As the result, the shaft 55 of the rotating magnetic pole 53 is subject to correspondingly increasing resistance to its rotation. Such resistance provides braking effect on the driving motor 21. The relation between the magnetizing current and the braking torque is exemplified by the curve shown in FIG. 5.

The magnetic fluid filling the space 56 may alternatively be powders of magnetic material, resulting in equivalent function.

Figure 6:
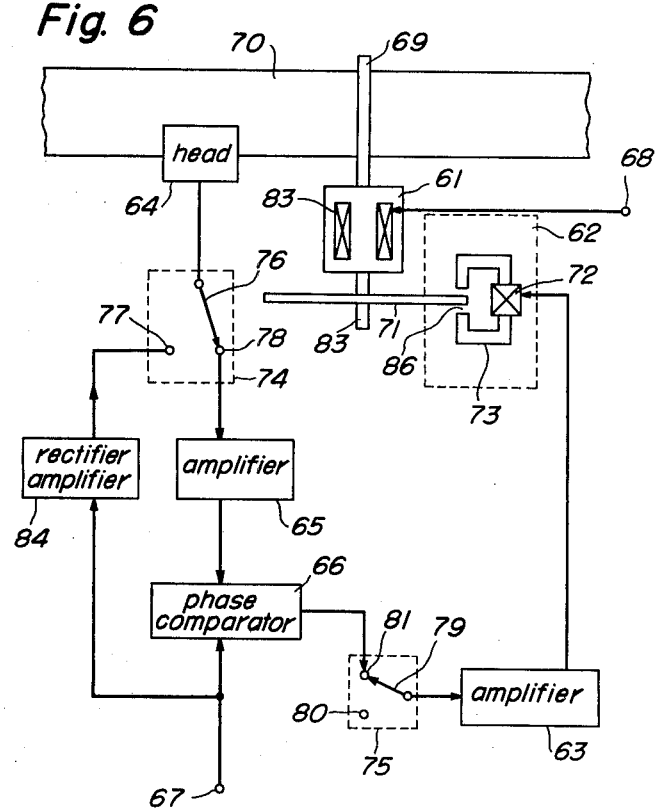
FIG. 6 is a diagram showing another embodiment of the invention utilizing an eddy-current type controller.

The electro-mechanical brake element may also take a form of eddy-current type controller which is most preferable. Referring to FIG. 6, the driving motor 61 has a capstan shaft 69 and a braking shaft 85 on which a rotating disc 71 of conductive material is mounted to rotate at the speed of motor rotation. Adjacent to the peripheral edge of the disc 71, an electro-magnet assembly 62 is disposed. The assembly 62 comprises a C-type magnetic core 73 and a magnetizing coil 72 therefor. The core includes an air gap 86, and the disc 71 has its peripheral edge revolving in the gap 86. When the core 73 is magnetized and the disc 71 rotates, there is produced eddy current in the disc 71 which applies braking effect to the motor shaft 83, in substantial proportion to the magnetizing current flowing through the coil 72. The characteristic curve of this type of brake element is similar to that shown in FIG. 5.

Figure 7:
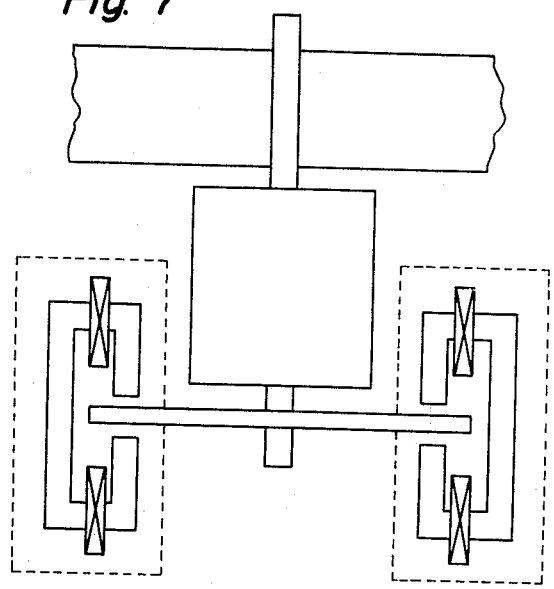
FIG. 7 shows another form of eddy-current type controller.

The electro-magnet assembly 62 may be divided into two smaller units each associated with the rotating disc as shown in FIG. 7, and in a manner similar to the assembly 62.

Figure 8:
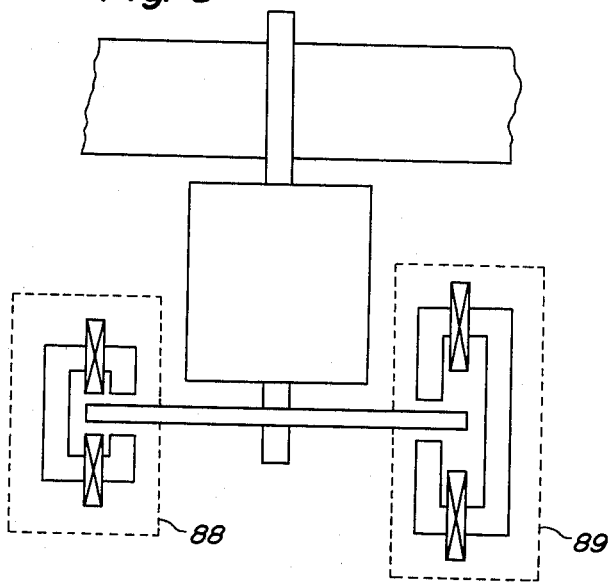
FIG. 8 shows a further form of eddy-current type controller.

In FIG. 8, two electro-magnet assemblies 88 and 89 are provided as in the embodiment shown in FIG. 7, but these two assemblies are assigned different functions. Thus, one assembly 88 is energized to keep a constant braking effect while the other 89 is energized to provide variable braking effect, as hereinafter to be explained in detail.

Referring again to FIG. 2, during recording operation of the system, the switch 35 is set to have the contacts 39–40 closed and the contacts 39–41 open. Thus, the phase comparator 26 is disconnected, and the D.C. output of the amplifier 23 does not change but is constant. The constant magnetizing current flowing through the brake element coil 33 produces a constant braking torque on the motor 21 which then maintains a constant speed rotation. The above-discussed constant braking torque should have a value suitable for proper operation of the automatic control loop during reproducing operation of the system. This value is to be predetermined within a range between the saturation value and zero value of the braking torque produced by the brake element 22. Such a range may be represented in FIG. 5, for example, by a range of magnetizing current from the maximum value at which the braking torque is saturated and the zero value. Consequently, the amplifier 23 is requested to supply a constant magnetizing current within the above-mentioned range to the brake element 22. In addition, since the constant magnetizing current should be varied depending upon various conditions, manual means must be provided for varying the constant output current of the amplifier 23.

On the other hand, the head-drum pulse signals produced in proportion to the rotating speed of the magnetic head drum containing magnetic transducers should be rectified in shape and prepared as reference signals. Such reference signals are introduced through a reference terminal 27 and a connection point 42 into a control signal recording amplifier 44, and through the switch contacts 36–37 (closed during recording operation) into a control signal recording head 24 disposed in proximity to the magnetic tape 30. Thus, the head 24 produces a magnetized recording track along one side of the tape 30 consisting of a series of control signals corresponding to the reference signals applied to the terminal 27. Such control signals recorded on the tape 30 are equally spaced due to the constant speed rotation of the motor 21.

During the reproducing operation, the track of control signals on the tape 30 causes the reproducing head 24 to produce electric signals. The control signals thus reproduced are introduced into the phase comparator 26 through the now-closed switch contacts 36–38 and an amplifier 25. Into the phase comparator 26, reference signals are also introduced from the terminal 27. The comparator operates to compare the phases of the control and reference signals with each other, and to produce D.C. output proportional to the phase difference between the two signals. The D.C. output is supplied to the amplifier 23 through the now-closed switch contacts 39–41 and then to the brake element 22. The value of the magnetizing current or the output current of the amplifier 23 would change or fluctuate in accordance with the actual fluctuation of running speed of the tape 30 above and below the constant value corresponding to the constant braking torque of the brake element 22 during the recording operation. The fluctuating magnetizing current should preferably be designed to fall in the linear portion of the curve shown in FIG. 5. Thus, the actual instantaneous running speed of the tape 30 being reproduced or played back is automatically maintained at the instantaneous speed at which the tape 30 was actually driven during the recording operation.

Here, the relation between the changes in braking torque or motor-output torque and the changes in rotating speed of the driving motor is subject to a limitation. Thus, the output torque and the rotating speed of the motor have their change components falling on the linear portion of the characteristic curve of induction type motor shown in FIG. 3.

It will readily be understood that the changes in the braking force produced by the electro-mechanical brake element are caused by the changes in consumed driving energy of the driving motor which is energized entirely from a commercial A.C. supply source. In other words, according to the present invention, the automatic control apparatus accomplishes the automatic control by changes in the consumed energy of the motor existing in the automatic control loop.

Figure 9:
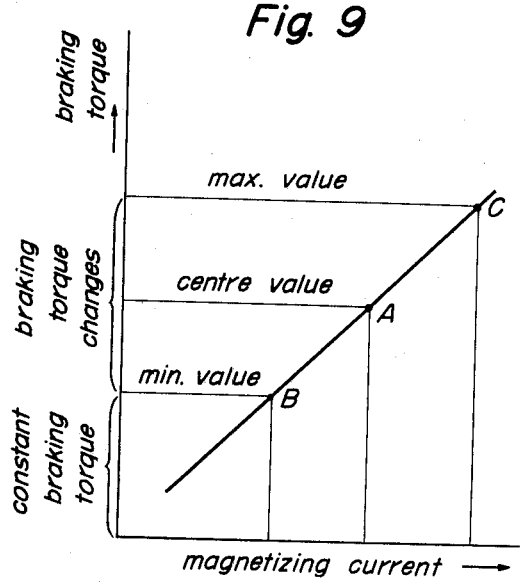
FIG. 9 is a curve diagram for explanation of operation of the eddy-current type controller shown in FIG. 8.

FIG. 9 shows an example of magnetizing current vs. braking torque curve of the brake element in the form of eddy-current type controller shown in FIG. 8. On this characteristic curve, the center value A of braking torque corresponds to the constant braking torque required in the recording operation. In considering the range of braking torque change during the reproducing operation with the center value A as the centre of change, the minimum value B and the maximum value C may be established as shown, and it is understood that there is a zone below the minimum value B where the braking torque does never change. In the brake element of FIG. 8, one magnet assembly 88 takes charge of the constant braking torque B which is the lower limit of the range within which the braking torque should be changed during the reproducing operation, while the other magnet assembly 89 operates to produce a variable braking torque which is zero at the point B and maximum at the point C.

It will readily be understood that the magnet assembly 88 is not always necessary to produce a constant braking torque equal to the minimum value B of the torque change. Thus, the magnet assembly 88 may produce a constant braking torque somewhat upper or below the value B, and the other magnet assembly 89 will produce a variable braking torque in a range having its lower limit somewhat larger or smaller than zero by an amount corresponding to the difference between the constant braking torque provided by the magnet assembly 88 and the value B.

Referring back to FIG. 2, the motor 21 may be a six-pole induction motor, and may be energized entirely from 60-cycle, 117 volt commercial A.C. supply source, and normally rotates at a speed of 1200 r.p.m. The motor is assumed to have a characteristic curve shown in FIG. 3. The capstan extension 29 of the motor has a diameter less than 8 mm., and adapted to drive the magnetic tape 30 at a linear speed of 15 in./sec. at the normal rotating speed of the motor. The lower extension 31 of the motor shaft has a diameter of 8 mm.

The magnetic tape 30 may be that usually called video tape having a width of 2 inches. The control head 24 may be usual sound recording and reproducing head with necessary changes. The switches 34 and 35 may be of relay type. The amplifiers 25 and 44 may be similar to a sound recording and reproducing amplifier with modifications necessary from the standpoint of the pulse art. They may be of either vacuum-tube type or transistor type.

Figure 10:
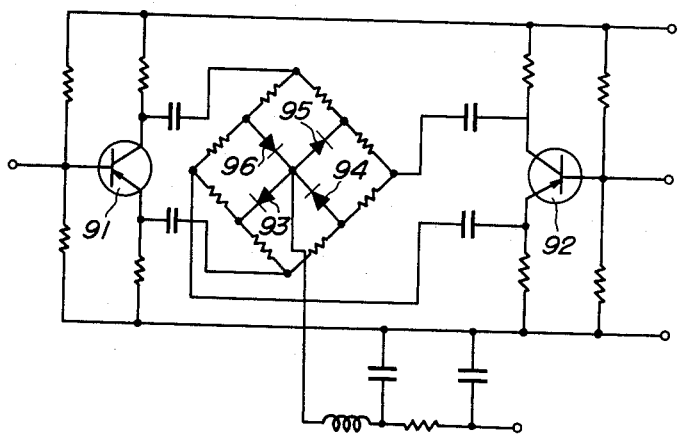
FIG. 10 is a circuit diagram of phase comparator adapted invention.

The phase comparator 26 may be of any known type. One example of phase comparator is shown in FIG. 10. It comprises two transistors 91 and 92, and four diodes 93, 94, 95 and 96.

The D.C. amplifier 23 is not necessary to have a large capacity, but may be of a small capacity whose output is lower than 0.8 w. in average, and 1.5 w. at the peak, and consequently, it may be a power vacuum-tube or transistor. Usually, a pre-amplifying stage is employed before the amplifier stage 23.

Figure 11:
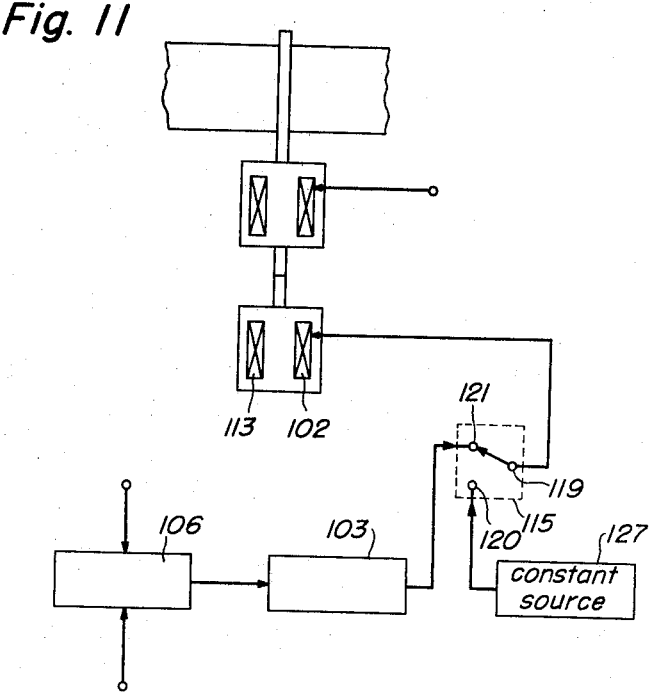
FIG. 11 shows an energizing circuit for the magnetizing coils of electro-magnetic brake element.

In order to supply a constant magnetizing current to the brake element 22 during the recording operation, a constant electrical source may be provided instead of the amplifier 23. FIG. 11 shows such a modification. During the recording operation, a change-over switch 115 is set to make the contacts 119–120, and the magnetizing coils 113 of the electro-mechanical brake element 102 is energized from a constant electric source 127. During the reproducing operation, the switch 115 is set to make the contacts 119–121, and the D.C. output of the phase comparator 106 is supplied to the brake element 102 through an amplifier 103.

In the magnetic-fluid type or magnetic-powder type of controller as exemplified in FIG. 4, may have the maximum braking torque of 6 kgcm., the maximum magnetizing current of D.C. 20 ma., and an impedance of 2.1 kilo-ohms.

In the eddy-current type controller as exemplified in FIG. 6, the disc 71 may preferably be made of copper or aluminum, with 180 mm. in diameter and 2 mm. in thickness. The magnetic core of the magnet assembly 62 may be 4 sq. cm. in cross-sectional area, and 26 cm. in magnetic path length, with the air gap having width of 4 mm. The magnetic core is of laminated construction composed of silicon steel sheets 0.35 mm. in thickness. The magnetizing coil wound on the core consists of two sub-coils of 2,400 turns of enamelled copper wire of 0.2 mm. diameter, the two sub-coils being connected in parallels. The maximum braking torque may be 1.3 kgcm. at the maximum magnetizing current of D.C. 200 ma., with an impedance of 60 ohms.

Figure 12:
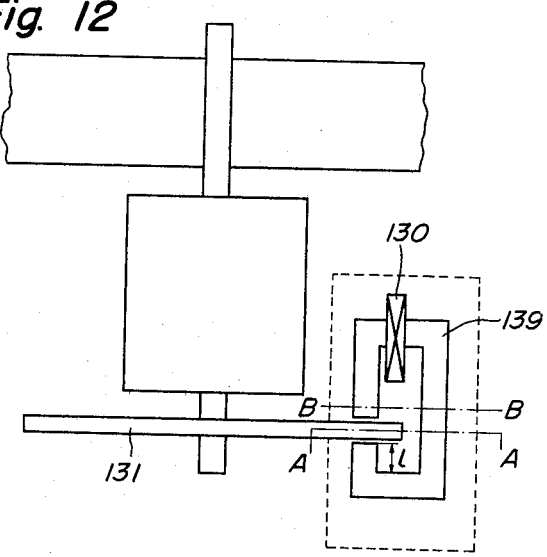
FIG. 12 shows an eddy-current type controller having a magnetic core with an air gap positioned offset with respect to the centre of the core.

In the foregoing embodiments, the magnetic cores of eddy-current type brake elements have their air gaps on the symmetrical center lines of the cores, but the air gap may be disposed offset with respect to the symmetrical center line as shown in FIG. 12. Thus in FIG. 12, the center line A—A of the air gap is somewhat displaced from the symmetrical center line B—B of the magnetic core 139. By this, a larger magnetizing coil 130 can be utilized. However, as the air gap is displaced away from the symmetrical center line of the core, there is a tendency to increase leakage flux, and therefore, the distance by which the gap is displaced must be limited in such an extent that sufficient braking effect may be obtained irrespective of minor leakage flux. If the length $l$ of the shorter leg adjacent the air gap is equal to or larger than the width of the gap, flux leakage will not be detrimental to proper operation of the brake element. Thus, for an air gap of 4 mm. in width, $l$ must be 4 mm. or more.

In the eddy-current type controllers hereinbefore explained, the magnetizing coils are energized by D.C. current. However, it is possible to energize the magnetizing coils with A.C. current. For example, a 60-cycle commercial A.C. supply source may be utilized. Thus, the amplifier for energizing the magnetizing coil of eddy-current type controller may be provided with an input for introducing thereinto A.C. energy from a commercial supply source, and the D.C. input from the phase comparator will change the D.C. operating point of the amplifier, although the operating efficiency would be somewhat lower than D.C. magnetization.

When more-than-two magnet assemblies are used in an eddy-current type controller, and each magnet assembly comprises a plurality of magnetizing coils, these coils may be connected in the circuit in various manners, taking the output impedances of amplifier, etc., into consideration for obtaining the most beneficial result. The coils may be connected all in series or parallel, or in series-parallel.

Figure 13:
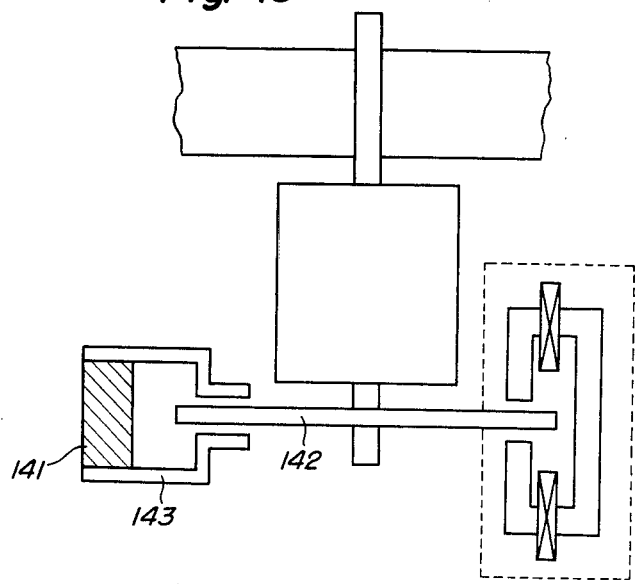
FIG. 13 shows an eddy-current type controller in which a permanent magnet is utilized for providing a constant braking force.

In the eddy-current type controller comprising two magnet assemblies, one for producing a constant braking torque and the other variable braking torque, the former assembly may be formed by a permanent magnet as shown in FIG. 13. The permanent magnet 141 is so designed that the requisite constant braking force may be obtained in cooperation with the rotating disc 142 and the magnetic yoke 143 properly positioned with respect to each other.

Figure 14:
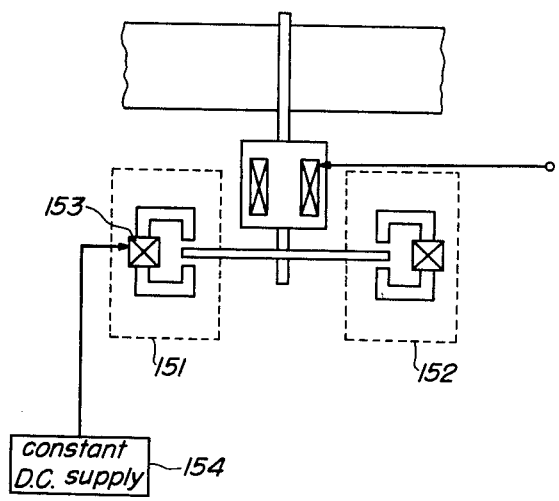
FIG. 14 shows another example of the energizing circuit for the magnetizing coils of eddy-current type controller.

The electro-magnet assembly for producing a constant braking effect may comprise a magnetic core of solid magnetizable material, instead of laminated core. Such a magnetic core may be magnetized by a constant current flowing through the magnetizing coil supplied from a constant voltage D.C. supply source. Referring to FIG. 14, two electro-magnet assemblies 151 and 152 are provided, one 151 for producing a constant braking force, and the other 152 for producing variable braking force. The magnetizing coil 153 of the assembly 151 is energized from a constant D.C. supply source 154. The magnet assembly 152 may be of the same type with the magnet assembly 62 in FIG. 6.

The eddy-current type controllers hereinbefore disclosed are of rotating disc type, but it will readily be understood that the discs may be substituted by rotors of copper or aluminum similar to those of electric motors, and the magnet assemblies may form the stators of electric motors, provided that they perform the functions of the electro-mechanical brake element as hereinbefore discussed.

Referring again to FIG. 6, a practical example of operation may be given as below. During the recording operation, the brake energizing amplifier 63 supplies a constant D.C. current of say, 90 ma. to the magnetizing coil 72 of the electro-magnetic assembly 62. This constant D.C. magnetizing current is selected in the range from 200 ma. to zero ma., corresponding to 1.3 kgcm. of saturated braking torque to zero torque, respectively. As an example, 90 ma. constant current has been selected, and it is assumed that this constant magnetizing current produces about 0.6 kgcm. braking torque in the rotating disc 71. Due to this braking torque, the driving motor 61 of rated speed of 1200 r.p.m. is rotated at a reduced constant speed of 1135 r.p.m., and drives the tape 70 at a linear speed of 15 inches per second. The tape 70 has a side zone of about 2 mm. width for control signal recording in cooperation with a recording head 64. The head 64 is energized by 60-cycle or 30-cycle rectangular wave signals applied to the reference signal terminal 67 and shaped and amplified in the amplifier 84. The amplified 60 p.p.s. or 30 p.p.s. control signals of pulse form are supplied to the head 64 through the switch contacts 76–77 being closed during the recording operation.

During the reproducing operation, the 60 p.p.s. or 30 p.p.s. control signals recorded on the tape 70 with certain variable components, are reproduced by the head 64. The reproduced pulses are introduced into an amplifier 65 through the switch contacts 76–78 now closed. The amplifier 65 converts the 60 p.p.s. or 30 p.p.s. rectangular pulses to 60-cycle or 30-cycle rectangular waves which are applied to the phase comparator 66 to which is also supplied the 60-cycle or 30-cycle rectangular reference signal waves from the input 67. The phase comparator 66 compares the phases of the control and reference signals with each other, and produces D.C. output representing the phase difference between the two signal waves. The D.C. output may be ±1 to several volts. This D.C. output is amplified by the brake element magnetizing amplifier 63, and fed back to the magnetizing coil 72 as the varying component fluctuating above and below the constant magnetizing current of 90 ma. The fed-back component of magnetizing current controls the braking effect on the motor 61 for comparating for variable component of the tape speed, thus completing an automatic control loop. The motor 61 may have the maximum output torque of about 2 kgcm. and drive the magnetic tape 70 with about 0.2 kgcm. torque. In addition, during the recording operation, the motor consumes a constant torque of 0.6 kgcm. due to the constant braking torque applied thereon. Thus, the total consumption of output torque of the motor 61 is 0.8 kgcm. During the reproducing operation, additional and variable braking torque of zero to 1.3 kgcm. is applied on the motor 61, and the motor consumes its 0.2 to 1.5 kgcm. output torque. By this reason, it is desirable that the motor 61 has a linear performance curve at least within the range from 0.2 to 1.5 kgcm. output torque.

I claim:

1. In an image recording and reproducing system for recording broad-band video signals on a magnetic tape linearly driven by an electric motor, an electro-mechanical brake apparatus comprising a periodic reference signal source, detector means for detecting said reference signals, means for producing control signals in accordance with said reference signal source, phase comparator means responsive to said reference and control signals for producing an error signal, means to amplify said error signal, an electro-mechanical brake means responsive to the output of said amplifier means for controlling the rotating speed of said motor which drives said magnetic tape, means for effecting constant speed rotation of the electric motor by assigning a predetermined value of braking force to said electro-mechanical brake means to oppose the torque of the driving motor according to the electrical input given to said brake means during the recording operation, means for reproducing said control signals recorded on said magnetic tape during the reproducing operation, means for changing the rotating speed of said motor through controlling said electro-mechanical brake element by said error signals, and means for controlling the running speed of said magnetic tape by said last-mentioned means to maintain the normal reproducing operation.

2. In an image recording and reproducing system for recording broad-band video signals according to claim 1, said electric motor being of the induction type, the driving energy consumed by said motor partly contributing to the energization of said electro-mechanical brake element, said electro-mechanical brake means being formed by an eddy-current type controller comprising a first magnetic assembly and a plurality of second magnet assemblies each consisting of a magnetizable core having an air gap and a magnetizing coil mounted thereon, and a rotating disc of conducting material associated with all of said magnetic assemblies, the peripheral portion of said disc passing through all of said air gaps, said first magnet assembly continuously producing a constant braking effect substantially equal to the minimum value of the variable braking effect produced by said brake element as a whole during the reproducing operation, said second magnet assemblies producing during the recording operation another braking effect which is added to said constant braking effect produced by said first magnet assembly thereby producing a braking effect of varying value, said first magnet assembly consisting of a solid magnetizable core and a magnetizable core formed by laminated steel sheets, and said second magnetic assemblies being electro-magnet assemblies having magnetizable cores formed by laminated steel sheets including air gaps associated therewith.

3. In an image recording and reproducing system for recording broad-band video signals consisting of a magnetic tape which is linearly driven by an electric motor, a rotating head drum containing magnetic transducers and an electro-mechanical brake apparatus comprising means for producing reference signals in accordance with the rotation of said rotating head drum, means for deriving control signals in accordance with said reference signals, means for recording said control signals on one side of said magnetic tape, an electro-mechanical brake means for controlling the rotating speed of said electric motor which drives said magnetic tape, said electro-mechanical brake means being of the type utilizing magnetic material of fluid nature, said brake element being energized from a source of constant current supply during the recording operation and by the signals produced in response to said error signals during the reproducing operation, for causing said electro-mechanical brake element to exert a predetermined value of braking effect on said electric motor according to the electrical input given to said brake element during the recording operation, means for causing said braking effect to make said motor rotate at a constant speed during the recording operation, means for reproducing said control signals recorded on said magnetic tape during the reproducing operation, means for producing error signals by comparing the phase of electrical signals produced in accordance with said reproduced control signals with the phase of said reference signals, means for changing the rotating speed of said motor through controlling said electro-mechanical brake element by said error signals, and means for controlling the running speed of said magnetic tape by said last-mentioned means to maintain the normal reproducing operation.

4. In an image recording and reproducing system for recording broad-band video signals according to claim 3, wherein said electro-mechanical brake is of an eddy-current type element and is operative in a manner that the current flowing through the magnetizing coils thereof is proportional to the braking torque at least in the operating range thereof, said motor being of the induction type and being adapted to be energized entirely from a source of commercial A.C. supply, the driving energy consumed by said motor partly contributing to the energization of said electro-mechanical brake means, said motor having a performance curve of substantially straight line between the rotating speed and the output torque at least in the operating range thereof.

5. In an image recording and reproducing system for recording broad-band video signals according to claim 3, said electro-mechanical brake means being formed by an eddy-current type controller comprising a magnetizable core having an air gap, a magnetizing coil mounted thereon and a rotating disc of conducting material associated with said air gap, said magnetizable core being formed by laminated steel sheets, said air gap being so positioned in said magnetizable core that any leakage flux may not be detrimental to the braking action of said brake element, said electro-mechanical brake element being operative in a manner that the current flowing through said magnetizing coil thereof is proportional to the braking torque at least in the operating range thereof, said motor being of the induction type and being adapted to be energized entirely from a source of commercial A.C. supply, the driving energy consumed by said motor partly contributing to the energization of said electro-mechanical brake element, said motor having a performance curve of substantially straight line between the rotating speed and the output torque at least in the operating range thereof.

6. In an image recording and reproducing system for recording broad-band video signals according to claim 3, said electro-mechanical brake means being formed by an eddy-current type controller comprising a plurality of electro-magnet assemblies, each consisting of a magnetizable core having an air gap and a magnetizing coil mounted thereon and a rotating disc of conducting material associated with all of said electro-magnet assemblies, the peripheral portion of said disc passing through all of said air gaps, said magnetizable cores being formed of laminated steel sheets, said electro-mechanical brake element being operative in a manner that the current flowing through said magnetizing coils thereof is proportional to the braking torque at least in the operating range thereof, said motor being of the induction type and being adapted to be energized entirely from a source of commercial A.C. supply, the driving energy consumed by said motor partly contributing to the energization of said electro-mechanical brake element, said motor having a performance curve of substantially straight line between the rotating speed and the output torque at least in the operating range thereof.

References Cited by the Examiner

UNITED STATES PATENTS

| | | | |
|---|---|---|---|
| 2,640,941 | 6/53 | Winther | 310—93 |
| 2,683,229 | 7/54 | Bessiere | 310—93 |
| 2,715,202 | 8/55 | Turner et al. | 318—302 X |
| 2,797,378 | 6/57 | Johnson | 318—302 |
| 2,866,143 | 12/58 | Maxwell | 318—302 |
| 2,886,757 | 5/59 | Johnson | 318—314 |
| 2,944,108 | 7/60 | Houghton | 318—314 X |

ORIS L. RADER, *Primary Examiner.*